T. GORDON.
REAR DRIVE CHASSIS FOR MOTOR CYCLES.
APPLICATION FILED AUG. 21, 1920.
1,427,731. Patented Aug. 29, 1922.
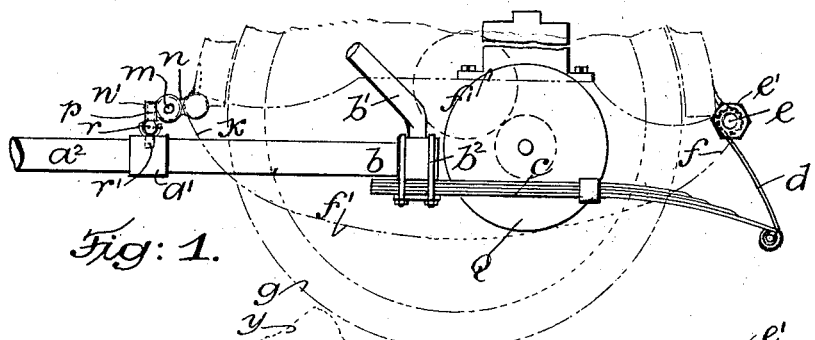
Fig: 1.
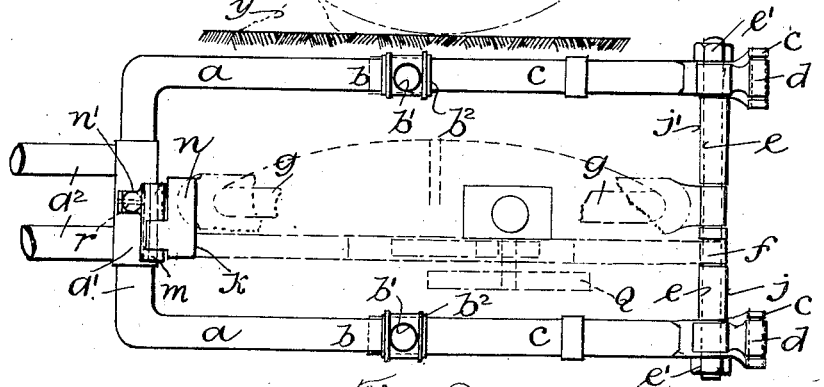
Fig: 2.
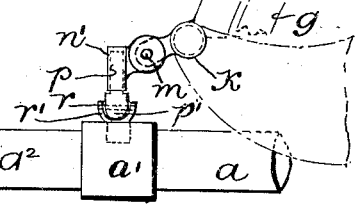
Fig: 4.
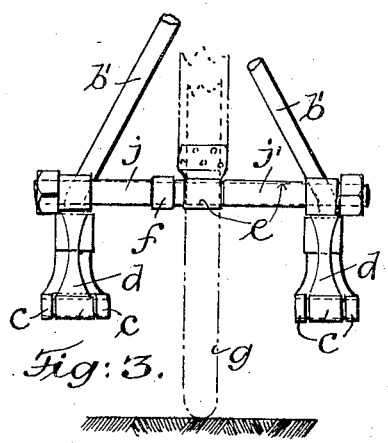
Fig: 3.
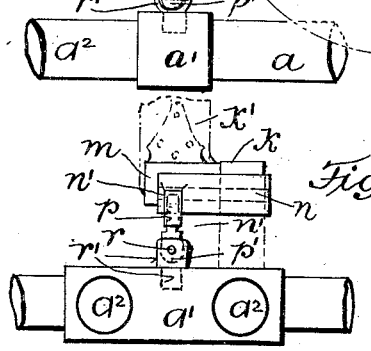
Fig: 5.
Witnesses:
Inventor:
Thomas Gordon
By
Attorney

UNITED STATES PATENT OFFICE.

THOMAS GORDON, OF PERTH, WESTERN AUSTRALIA, AUSTRALIA.

REAR-DRIVE CHASSIS FOR MOTOR CYCLES.

1,427,731.   Specification of Letters Patent.   Patented Aug. 29, 1922.

Application filed August 21, 1920. Serial No. 405,191.

*To all whom it may concern:*

Be it known that I, THOMAS GORDON, a subject of the King of Great Britain, residing at 261 Murray Street, Perth, Western Australia, Commonwealth of Australia, have invented certain new and useful Improvements in Rear-Drive Chassis for Motor Cycles, of which the following is a specification.

This invention relates to motor cycle frames and its object is to provide a rear drive chassis frame on which is installed as a combined and operative unit the rear road wheel and the thereto directly connected driving motor, and one of the advantages of the said invention is that a direct and positive drive is effected for said rear road wheel and without the aid of chain or belt.

The rear frame is of a resilient, hinged and flexible character having shock absorbing springs and hingedly and frontwardly connected to the main cycle body frame whereby the rear wheel and engine is adapted to gently rise and fall when passing over obstacles and other irregularities of the road.

The frame further possesses structural means whereby a lateral yieldability is imparted thereto which enables the motor cycle to turn corners without being subject to side strain or swerve troubles.

The invention will now be explained with the aid of the attached drawings wherein Fig. 1 is a side view showing a rear drive chassis made in accordance with my invention and having the rear road wheel and driving engine installed thereon. Fig. 2. is a plan view of same. Fig. 3. is a rear elevation. Figs. 4 and 5 are respectively enlarged side and front detail views showing the hinged connection of the rear chassis with the main frame of the cycle. In said drawings the existing members of the motorcycle are indicated by broken lines.

Referring to said drawings I employ a double forked member as $a$ which by its bridge portion $a^1$ is connected to the lower stay bars $a^2$ of the cycle frame. To each of the terminals $b$ of the said forked member $a$ is secured the upwardly inclined stay bars $b^1$ of the cycle. To each said terminals $b$ by U bolts $b^2$ and nuts is secured and anchored a group of downwardly curved springs $c$ which act as the shock absorbing agents for the chassis and its associated members. The rear terminals of said springs $c$ by the strap plate $d$ are hingably and freely hung to an upper and rear cross bar $e$, secured in position by the terminal nuts $e^1$. On this rear cross bar $e$ by the lug $f$ is secured the casing $f^1$ of the driving motor $t$ having a flywheel $q$ and the thereto connected road wheel $g$—see Fig. 1.

On said bar $e$ are the distance sleeves $j$—$j^1$ which are positioned as shown between the lug $f$ and the strap plate $d$. The duty of said plates $d$ is to allow the springs $c$ to open or straighten out by the superimposed weight when the road wheel $g$ is passing over an obstacle as $y$ or other irregularity of the road.

The engine casing $f^1$ and road wheel $g$ are connected to the front rigid part $a^1$ of the rear fork by means of a universal connection or joint comprising a two part bracket $n$ having an eye in one end for the reception of the pin $m$ and an eye in the other end for the reception of a pin $r$. These pins are arranged perpendicularly to one another and pivotally connect the joint to the lug $k$ of the motor wheel frame and to the bracket $r^1$ secured to the fork. These pins permit swinging of the cycle relative to the motor wheel unit in vertical planes. The universal connection is provided with a vertical socket $n^1$ in which is rotatably housed the boss $p$ which carries the pin $r$. This boss and socket permit relative movement of the cycle and motor wheel unit in a horizontal plane.

By means of the hinge or rocker pin $r$ the chassis frame is adapted to possess a lateral movement and yieldability and thereby obviate all side strain or swerve when the motor cycle is turning corners.

It is apparent that upon the road wheel $g$ meeting with an obstacle as $y$ on the road, said wheel $g$ and its thereto connected engine and casing $f^1$ when passing over same will gently and hingedly rise on the front pin $m$ while by the agency of the pair of leaf springs as $c$, all shock and jar will be absorbed and nullified.

What I claim as my invention and desire to secure by Letters Patent is:—

1. In motor cycles of the motor wheel type, a rear fork having a leaf spring extending rearwardly from each side, a cross bar carried by the ends of said leaf springs, a motor wheel unit within said fork pivotally mounted at its rear end upon said cross bar, and a universal joint connecting the forward end of said motor wheel unit to said fork.

2. In motor cycles of the motor wheel type, a frame comprising a rear fork having sides, the forward portion of said fork being rigid, and the rearward parts being resilient, a motor wheel unit arranged within said fork and having a frame, a transverse bar pivotally connected to the rear end of said frame, means connecting the resilient ends of said fork to said transverse bar and a universal joint connecting the forward end of the motor wheel frame to the rigid portion of said fork.

3. In a motor cycle of the motor wheel type, a frame comprising a rear fork having sides, the forward portion thereof being rigid, and the rearward parts thereof being resilient, a motor wheel unit positioned within said fork and having a frame, a transverse bar pivotally connected to the rear end of said frame, means for supporting the ends of the resilient portions of said fork from said transverse bar, spacers mounted on said bar between said motor wheel unit and said supporting means for centrally positioning said motor wheel unit, and a universal joint connecting the front of the frame of said motor wheel unit to the rigid portion of said fork.

In testimony whereof I have hereto set my hand in presence of two subscribing witnesses.

THOMAS GORDON.

Witnesses:
RICHARD SPARROW,
FRED H. LAMBERT.